United States Patent [19]

Ueno et al.

[11] 4,423,686

[45] Jan. 3, 1984

[54] TABLE APPARATUS

[75] Inventors: Katumi Ueno; Genichi Nishizaki, both of Tanashi, Japan

[73] Assignee: Citizen Watch Company Limited, Tokyo, Japan

[21] Appl. No.: 334,055

[22] Filed: Dec. 23, 1981

[51] Int. Cl.³ .............................................. A47B 37/00
[52] U.S. Cl. .................................... 108/20; 74/89.22; 108/137; 248/424
[58] Field of Search ............... 108/20, 21, 137; 74/16, 74/10.7, 89.2, 89.22, 479; 248/424; 269/73

[56] References Cited

U.S. PATENT DOCUMENTS

| | | | |
|---|---|---|---|
| 1,734,553 | 11/1929 | Bartlett | 74/10.7 |
| 2,677,923 | 5/1954 | Parker | 74/89.2 |
| 3,069,153 | 12/1962 | Brown | 269/73 |
| 3,495,519 | 2/1970 | Alfsen et al. | 108/20 |
| 3,689,819 | 9/1972 | Kamimura et al. | 74/16 |
| 3,762,232 | 10/1973 | Müller | 74/89.22 |

Primary Examiner—William E. Lyddane
Assistant Examiner—Mark Binder
Attorney, Agent, or Firm—Jordan and Hamburg

[57] ABSTRACT

A table apparatus provided with a stacked array of upper and lower slides which are driven independently of each other, in which at least one slide surface of the lower slide is a slide guide shaft which is reciprocatively rotatable and which has a non-circular cross-section, and in which there are provided a rotation transmission mechanism disposed on the table of the lower slide and engaging with the slide guide shaft, said transmission mechanism being slidable axially of the slide guide shaft and rotatable along with said slide guide shaft, and an upper slide drive mechanism for sliding the upper slide in response to the rotation of said rotation transmission mechanism.

6 Claims, 7 Drawing Figures

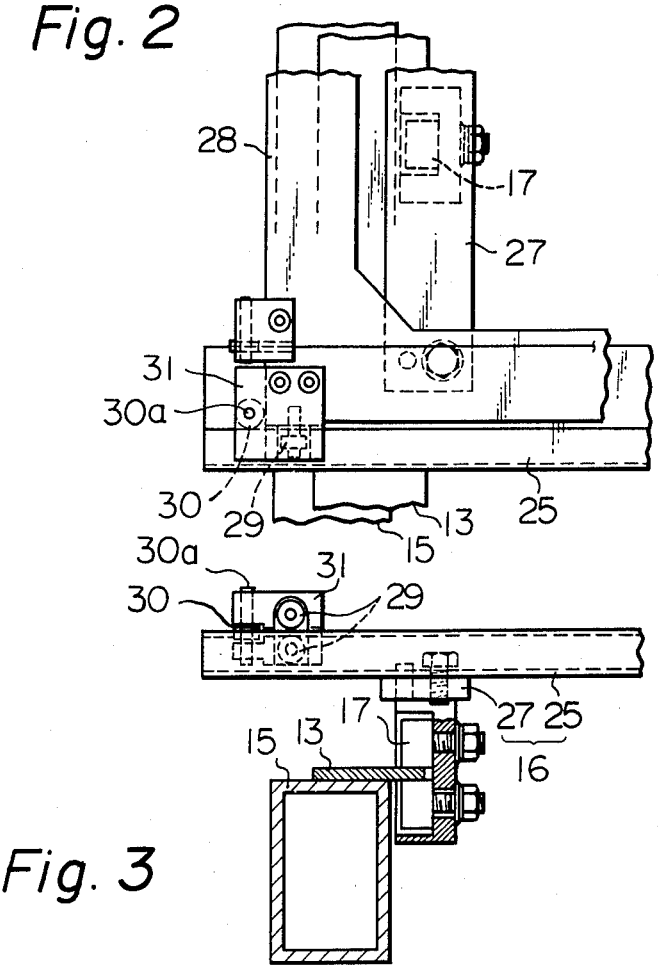

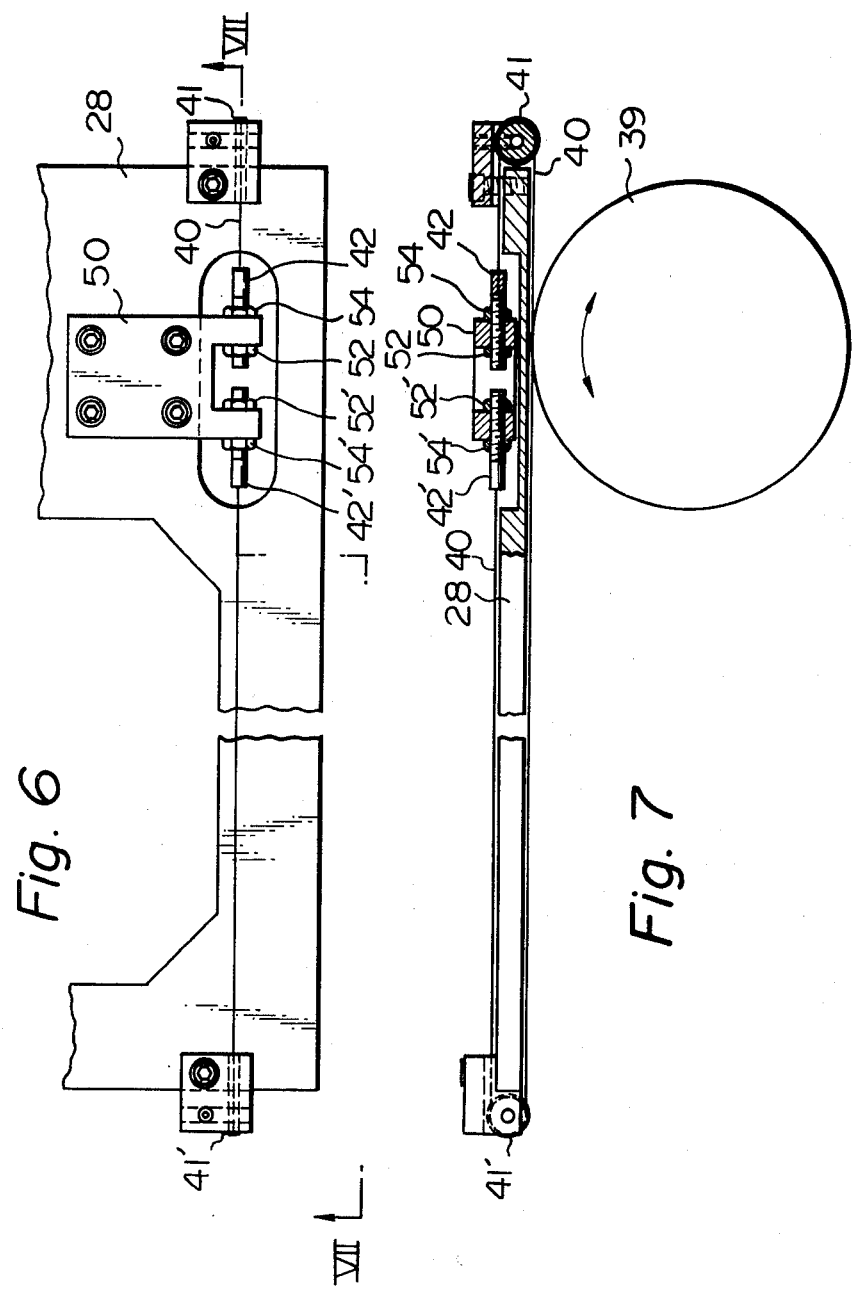

TABLE APPARATUS

BACKGROUND OF THE INVENTION

This invention relates to a table apparatus for use in an automatic assembling machine or the like and, more particularly, to the drive mechanism of a table apparatus in which it is necessary to slide a table at high speed over a long stroke.

A table apparatus, particularly an X-Y assembly or rotary table assembly capable of being driven independently along mutually perpendicular axis, is employed as a positioning table in machine tools and in a many other fields.

A table apparatus of the above type has a base on which a guide surface (or guide shaft) is provided, and carries a slide which is capable of being slid along the guide surface or guide shaft. In the usual arrangement a drive source (such as a DC motor or pulse motor) is secured to the base, and a feed screw or the like transmits the power provided by the drive source in order to move the slide. Individual tables of this type are stacked to construct an X-Y table assembly, rotary table assembly or the like.

The conventional apparatus has been unable to satisfy the need for a high-speed sliding capability over a long stroke, as well as the need for high positioning accuracy. The problems are as follows:

(1) Costs are raised because a long feed screw is required for the long stroke. Cost are raised even further when a ball screw is used to achieve high speed rotation of the feed screw.

(2) The feed screw must be rotated at high speed to slide the table at high speed, but the rotational speed of the feed screw is limited by the material of which the screw and nut are constructed, as well as by their shape, dimensions, method of machining, supporting structure and the like. High speed rotation of the screw even within the allowable limits is undesirable in terms of durability.

(3) To slide a table at high speed it is preferred that the table be as light in weight as possible in order to reduce its inertia. With the conventional arrangement, however, the table of the lower slide serves as the base for the upper slide, and the drive source for the upper slide must be slid together with the table of the lower slide. The inevitable result is greater weight and high inertia.

SUMMARY OF THE INVENTION

The present invention seeks to solve the aforementioned problems and provide a table apparatus having a high-speed sliding capability over a long stroke.

BRIEF DESCRIPTION OF THE DRAWINGS

FIG. 2 is an enlarged view of section A shown in FIG. 1;

FIG. 3 is sectional view taken along the line III—III of FIG. 1;

FIG. 6 is a plan view showing the principal portion of an upper slide; and

FIG. 7 is a sectional view taken along the line VII—VII or FIG. 6.

DESCRIPTION OF THE PREFERRED EMBODIMENTS

A preferred embodiment of the present invention will now be described in conjunction with the accompanying drawings.

Figure 1:
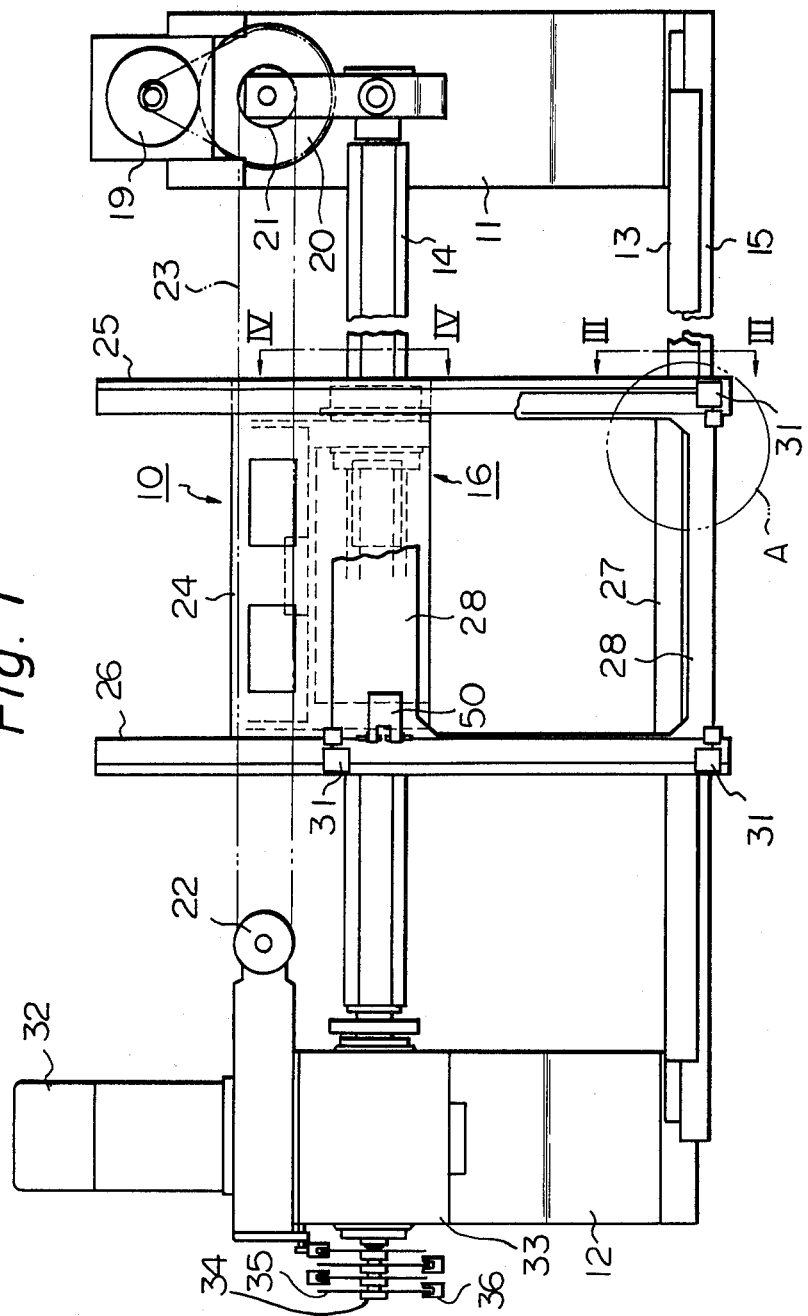
FIG. 1 is a plan view illustrating a preferred embodiment of a table apparatus according to the present invention.

FIG. 1 is a plan view of a table apparatus according to the present invention. The table apparatus 10 has support blocks 11, 12, a guideway or guide plate 13 extending between the support blocks 11, 12 and a longitudinal slide 16 is slidably supported by the guide plate 13 and the guide shaft 14.

As shown in FIG. 3, the guide plate 13 is a flat plate which is fixedly secured to a hollow, rectangular column 15 bridging the support blocks 11, 12, and which is embraced from either side by roller pairs 17 a plurality of which are provided on the longitudinal slide 16, allowing the slide to be slid longitudinally as it is guided and supported by the guide plate 13.

Figure 4:
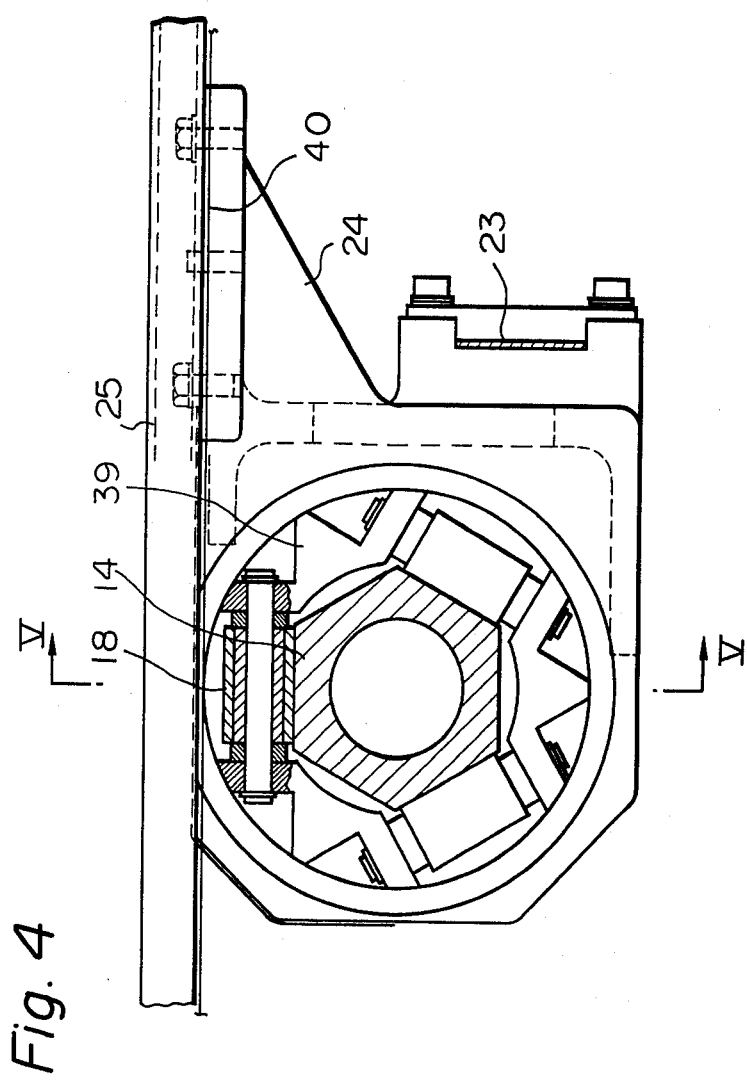
FIG. 4 is a sectional view taken along the line IV—IV of FIG. 1.

The guide shaft 14 is a hollow bar having a hexagonal cross-section, as illustrated in FIG. 4, and lies parallel to the guide plate 13. The guide shaft 14 is rotatably supported at the end portions thereof by the support blocks 11, 12, and is embraced by three guide rollers 18 provided on the longitudinal slide 16. Thus the slide 16 is guided along the guide plate 13 and the guide shaft 14 longitudinally as it is slid.

A pulse motor 19 provided on the support block 11 drives a pulley 20 through suitable speed reduction means, thereby driving a belt 23 stretched parallel to the guide shaft 14 between a pulley 21 provided coaxially with the pulley 20, and a tension pulley 22 provided on the support block 12. The longitudinal slide 16 has a frame 24 to which the belt 23 is fixedly secured, so that rotating the pulse motor 19 slides the longitudinal slide 16 in the longitudinal direction along the guide shaft 14 and guide plate 13.

The longitudinal slide 16 in the present embodiment is constructed as a frame to lighten its weight as much as possible. Specifically, two guiderails 25, 26 formed of shape steel are fixedly secured to the frame 24 so as to lie in parallel with each other, and are interconnected by a connecting rod 27 at the ends thereof.

The guide rails 25, 26 are members which define guide surfaces of an upper or cross slide. As shown in FIG. 3, the upper slide comprises guide blocks 31, each block having a pair of guide rollers 29. The guide rails 25, 26 are embraced from above and below by the pair of guide rollers 29. Guide blocks 31, are guided along the upper surfaces of the guide rails 25, 26 on the inward sides thereof. Guide blocks has rollers 30 supported on vertical shafts 30a and are provided on a flat table 28 whose central portion has been cut out to reduce weight. The guide blocks 31, one provided at each of the four corners of the table 28, permit the table 28 to be slid transversely of the apparatus along the guide rails 25, 26.

The guide shaft 14, rotatably supported by the support blocks 11, 12 as mentioned above, is rotated through a gear box 33 by a pulse motor 32 provided on the support block 12. One end of the guide shaft 14 penetrates the gear box 33 and projects from the outer side thereof, defining a cam shaft 34. Timing cams 35 are mounted on the cam shaft 34, and sensing means 36

(proximity switches in this embodiment) are provided to produce timing signals upon sensing the timing cams.

Figure 5:
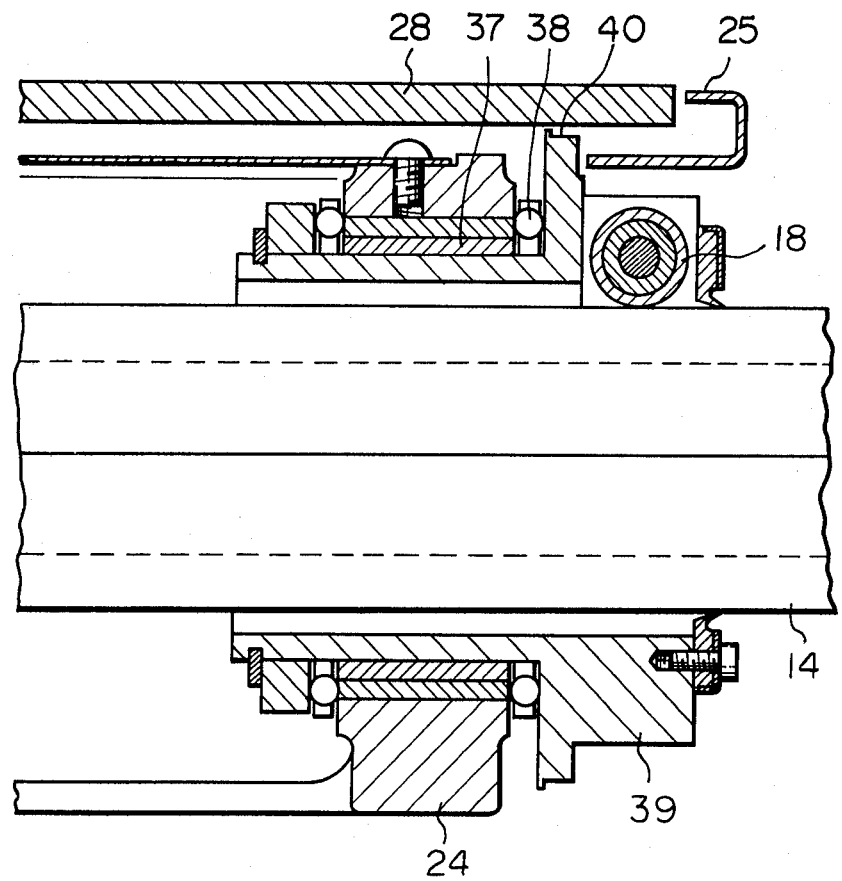
FIG. 5 is a sectional view taken along the line V—V of FIG. 4.

The rollers 18 embracing the guide shaft 14 are provided on a rotary block 39 which forms a part of a rotation transmission mechanism and which is rotatably supported on the frame 24 by means of bearings 37, 38, as shown in FIG. 5. Thus the rotary block 39 is capable of being slid along the guide shaft 14 in the manner described above and rotates as the guide shaft 14 rotates. Owing to such rotation of the rotary block 39 the upper slide can be slid by any suitable means. An embodiment of such an arrangement is shown in FIGS. 6 and 7. In FIGS. 6 and 7, idle pulleys 41, 41' are provided at both ends of the table 28, and wire cable 40 is passed along the lower side of the table 28 after it is wound around and secured to the rotary block 39 provided below the table 28. The wire cable 40 is passed over the idle pulleys 41, 41' until it reaches the upper surface of the table 28 where the ends of the wire cable 40 are affixed thereto. While any method may be used to affix the ends of the wire cable, in accordance with the embodiment threaded end fixtures 42, 42' for the wire cable are inserted into a fixture plate 50, and the ends of the wire cable 40 are attached to the end fixtures 42, 42' which are adjusted and locked into place by means of nuts 52, 52', 54, 54' for the purpose of adjusting the cable tension in simple fashion. The diameter of each idle pulley 41, 41' is slightly larger than the thickness of the table 28, and the center of each pulley is positioned on a line passing through the center of the table 28 with respect to the thickness thereof (or, more specifically, at a position where the bending forces acting upon the table will neutralize one another). Owing to this arrangement, the tension applied by the wire cable 40 is converted into a compressive force which acts along said center line of the table 28, so that the table 28 will not bend as long as it is not subjected to a heavy weight. In practice the idle pulleys 41, 41' need not be positioned with such precision. That is, the table 28 will be bend very little by tension of ordinary magnitude if the center of each pulley 41, 41' is situated at a point between the upper and lower surfaces of the table.

Since rotating the guide shaft 14 rotates the block 39, one end of the wire cable 40 is taken up and one end is payed off. The table 28 thus can be slid along the guide rails 25, 26. In other words, the table 28 is slid transversly when the wire cable 40 is taken up and payed out by the rotary block 39 as the guide shaft 14 rotates.

What is claimed is:

1. A table apparatus with support blocks, comprising:
   a guide way means extending between said support blocks;
   a non-circular guide shaft extending between said support blocks in parallel to said guide way means;
   a lower slide slidably supported by said guide way means and said guide shaft, said lower slide being longitudinally movable along said guide way means and said guide shaft;
   an upper slide slidably mounted on said lower slide;
   drive means for rotating said guide shaft; and
   a rotation transmission mechanism engaging with said guide shaft and slidable therealong, said rotation transmission mechanism being drivably connected to said upper slide to move said upper slide in a direction perpendicular to an axis of said guide shaft in response to rotation of said guide shaft.

2. A table apparatus according to claim 1, in which said lower slide comprises a frame composed of a pair of guide rails extending perpendicular to an axis of said guide shaft, and a connecting rod interconnected to said pair of guide rails at ends thereof, said pair of guide rails constituting guide surfaces for said upper slide.

3. A table apparatus according to claim 2, in which said upper slide has a flat table lying above said lower slide and having guide blocks provided at corners of said flat table, said guide blocks cooperating with said pair of guide rails of said lower slide to permit movement of said flat table along said guide rails.

4. A table apparatus according to claims 1, 2 or 3, in which said rotation transmission mechanism comprises a wire cable and a rotary block operatively disposed on said guide shaft, said rotary block including means engaging with a surface of said guide shaft for moving said lower slide along said guide shaft, said wire cable cooperating with said rotary block to transmit rotation of said guide shaft to said upper slide such that said upper slide moves perpendicular to the axis of said guide shaft when said guide shaft is rotated by said drive means.

5. A table apparatus according to claims 1, 2, or 3, further comprising belt means extending between said support blocks and connected to said lower slide to move said lower slide along the axis of said guide shaft.

6. A table apparatus according to claim 4, further comprising idle pulleys provided at both ends of said flat table, such that a center of each of said idle pulleys is positioned on a line passing through a center of said table and said wire cable is tensioned at idle pulleys on both sides of said flat table.

* * * * *